June 23, 1970 R. H. BRITTON, JR 3,517,213

HIHG FREQUENCY DETECTOR

Filed Aug. 3, 1967

INVENTOR.
RALPH H. BRITTON JR.
BY
Townsend and Townsend
ATTORNEYS 3,517,213
HIGH FREQUENCY DETECTOR Ralph H. Britton, Jr., Palo Alto, Calif., assignor to Pacific Measurements, Inc., Palo Alto, Calif., a corporation of California Filed Aug. 3, 1967, Ser. No. 658,245
Int. Cl. H03k *5/20*
U.S. Cl. 307—231 4 Claims

ABSTRACT OF THE DISCLOSURE

A wide range rectifying detector having a pulse generator in precise phase relationship to the input signal in which the pulse output to the pulse generator is connected to gate the input signal at precise phase times to the output.

This invention relates to a detector for rectifying alternating current throughout a wide dynamic range and frequencies.

In many applications, it is desirable to provide a rectifying detector which is sensitive to RMS inputs of relatively low voltage which vary considerably in dynamic range and which further vary considerably in their frequency. The present invention is concerned with a device which processes the input signal by the use of a high speed gate-shunt circuit of such a character as to pass no voltage in the absence of an energizing trigger pulse and which is further adapted to pass the full input through the circuit when appropriately triggered and to provide trigger pulses derived from the input signal in such a way as to position the pulses in precise phase synchronization and to thereby provide an output which is precisely equal to $1/\pi$ times the peak AC signal.

A feature and advantage of the device in the present invention lies in the fact that the device can operate with low signal levels in the order of 300 microvolts RMS to 1 volt RMS with frequency responses from 10 Hz. to greater than 5 mHz. with linearity of better than one percent.

In the present invention, the above results can be accomplished without being limited by rectifying semiconductor junctions or by peak holding capacitors, nor is the output voltage of the device limited by requirements of operating a rectifier in a current rather than in a voltage mode.

A further feature and advantage of this invention lies in the fact that the linearity is not dependent upon having large signals available to overcome essential nonlinearities of rectifying junctions.

Another object and advantage of this invention is to provide a wide range rectifying detector which maintains linearity through a wide operating range in the order of at least 80 db.

Other objects, features and advantages of the present invention will be more apparent after referring to the following specification and accompanying drawings in which.

Figure 1:
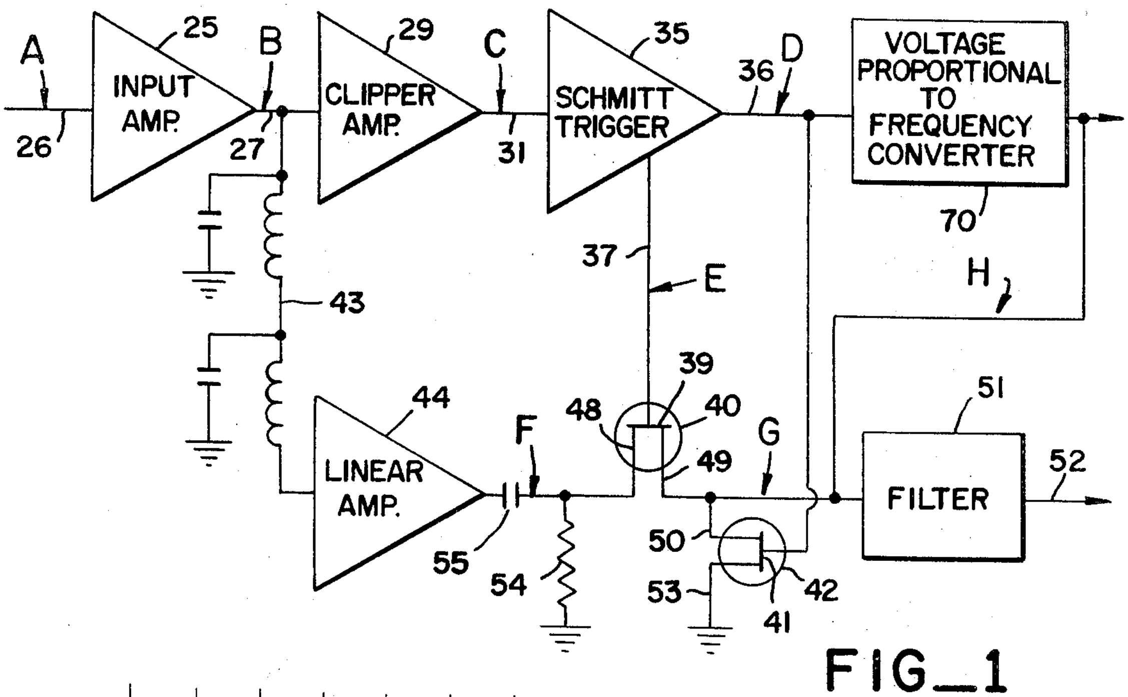
FIG. 1 is a diagrammatic view showing the invention.

Referring now to the drawings, there is provided in FIG. 1 an input amplifier 25 which has a small gain factor of approximately 2.2 times input. The essential purpose of amplifier 25 is to isolate the input signal appearing at 26 from the output at 27 and to convert a relatively high impedance input to a relatively low impedance at the output leg or line 27. Amplifier 25 can be of any standard amplifying circuit design having relatively high impedance input and a relatively low impedance output.

The output from line 27 is first fed to a clipping amplifier 29. Amplifier 29 is arranged to amplify the input signal and clip the peaks to obtain a substantially square wave output on line 31. The essentially square wave is then fed to a Schmitt trigger 35 which is arranged to provide a push-pull output in which one phase appears at line 36 and the opposite phase appears at line 37. The output from lines 37 is applied to the gate 39 of a MOS field effect transistor 40. Leg 36 is connected to the gate 41 of a MOS field effect transistor 42. At the same time, the output from leg 27 from isolation amplifier 25 is passed through an LC network 43 to a linear amplifier 44 and thence to the source 48 of transistor 40. The drain 49 of transistor 40 is then applied to the drain 50 of transistor 42. The source 53 of transistor 42 is passed to ground. The connected together drain 50 and drain 49 of transistors 40 and 42 are connected to a filter 51 having an output line 52. Amplifier 44 is coupled through a capacitor 55 and a load resistor 54 to the source 48 of transistor 40.

Figure 2:
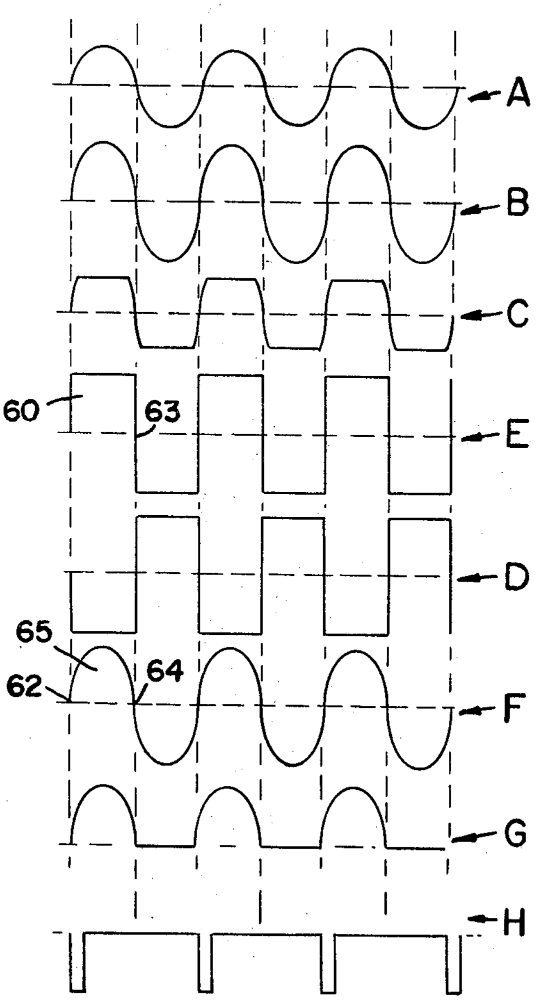
FIG. 2 is a timing chart showing representative pulse and wave forms at various points within the circuit of FIG. 1.

In operation, as can be seen in FIG. 2, a sine wave A is applied at line 26 to the input of isolation amplifier 25 providing an identical amplified sine output wave B at output line 27. Sine wave B is then passed to clipping amplifier 29 to provide a substantially square wave output C which is fed to Schmitt trigger 35. The Schmitt trigger provides a symmetrical square wave of constant amplitude as indicated at D on line 36 and an oppositely phased comparable wave at E on line 37. At the same instant, the sine wave B on line 27 is passed through the LC network 43 which is designed to effect a time delay which will be hereinafter more fully described. The slightly delayed signal is fed through linear amplifier 44 to provide a sinusoidal output signal F to source 48 of transistor 40 which is identical in symmetry and amplitude to the wave B appearing at line 27. Signal F appearing at source 48 can only pass to drain 49 when gate 39 is pulsed with a positive pulse applied thereto from Schmitt trigger 35. The phase timing is such from the Schmitt trigger that the positive pulse E occurs at 60 precisely at the beginning or zero point 62 of sine wave F and is turned off at the tail end of the pulse at 63 which is at the zero point 64 of sine wave F. This allows only the positive portion 65 of sine wave F to pass through transistor 40 thus providing an output pulse form as seen at G which includes only the positive portion of sine wave F. At the same instant, the square wave D is applied to gate 41 of transistor 42 which functions to shunt any signal appearing at drain 49 when the gate 41 is energized with a positive pulse. This occurs as can be seen in wave form E at exactly diametrically opposite times as the positive pulse occurs for wave form D. By this means, there is an open circuit to ground from drain 49 during the intervals that gate 39 is energized and a substantially short circuit to ground through transistor 42 when gate 39 is deenergized. The signal is then filtered by filter 51 to provide a full DC signal at the line 52 which is directly proportional to the RMS voltage appearing at input 26 to amplifier 25. The LC network delay line 43 is arranged to delay the signal to linear amplifier 44 at a time interval calculated to cause the exact coincidence of the gating pulses derived from Schmitt trigger 35 to gates 39 and 41. This can be conveniently accomplished by feeding a constant input signal at line 26 and adjusting the delay 43 to obtain maximum output at the output line 52 from filter 51.

In this circuit it can be seen that the trigger pulses for gates 39 and 41 are derived from the same signal source as the signal to be measured and, as such, any phase shift of the input signal will produce a similar phase shift to gates 39 and 41. Because of this factor, the device can operate through wide variations of frequency changes and with input signals which vary in wide dynamic range in both frequency and amplitude. The output from filter 51 will always therefore be an analog of the input signal appearing at line 26. With amplifier 25 having a gain factor of 2.2, the analog DC output at line 52 will be at unity with the RMS voltage appearing at the input amplifier 25.

In this circuit at higher frequencies there may be a capacitive effect causing some of the gate voltage to appear at the drain 49. This can be compensated by providing a converter 70 which is arranged to convert the constant amplitude pulses from Schmitt trigger 35 to a current which is directly proportional to frequency. This can be accomplished as seen in wave form H by averaging short duration pulses which occur with each shift of Schmitt trigger 35. The current output is then fed in reverse direction to the signal appearing at line 37 to cancel any voltage which would pass from gate 39 to drain 49. In this device, the amount of current transfer from gate 39 to drain 49 would be directly proportional to the frequency. The reverse current from converter 70 is also directly proportional to frequency and adjusted to appropriate value thus effecting a complete cancellation of any gate current transfer to drain 49 thereby insuring the complete analog of output signal 52 in DC values to the RMS value of the signal appearing at line 26.

In the present circuit, the essence of the device is in shunt gating of the input signal by constant amplitude in phase trigger pulses D and E derived from the source signal itself and in timed relationship to appear at precisely the zero level of the signal appearing at the source 48 of transistor 40.

While one embodiment of this invention has been shown and described, it will be apparent that other adaptations and modifications an be made without departing from the true spirit and scope of the invention.

What is claimed:

1. A device for converting an AC signal to an analog DC comprising: amplifier means to divide said AC input signal into a first leg and a second leg in substantial isolation from said input signal, trigger means in said first leg to convert said signal to push-pull square waves of constant amplitude and of a frequency equaling the frequency of said input signal; first gate means operable to gate a signal therethrough, second gate means operable to gate the signal passing through said first gate means to ground to effect a shunt of the signal from said first gate means, the output from said trigger means being applied to trigger said trigger means being applied to trigger said first gate means and said second gate means in oppositely phased relation, and means connecting the second leg to said first gate means whereby said first gate means is energized to pass an entire half pulse of said input signal and to resist and shunt the passing opposite half pulse.

2. A device for converting an AC signal to an analog DC according to claim 1 and having means mounted in the second leg and before the input of said first gate means to adjust the phase of said input signal in phase adjustment to the phase of said square waves at a point where the zero point of the input signal to the said first gate means occurs at precisely the same time interval as the beginning of the trigger pulse to said first gate means.

3. A device for converting an AC signal to an analog DC according to claim 1 and wherein said first and second gate means each comprise a MOS field effect transistor.

4. A device for converting an AC signal to an analog DC according to claim 1 comprising: current means connected to said trigger means to provide a current proportional to the frequency of pulses derived from said trigger means, and means connecting said current means to said first gate means in opposite direction to the direction of the current applied by said trigger means to said first gate means.

References Cited

UNITED STATES PATENTS 3,019,426 1/1962 Gilbert -------- 307—241 XR

JOHN J. HEYMAN, Primary Examiner
J. ZAZWORSKY, Assistant Examiner

U.S. Cl. X.R.

307—232, 236, 261, 251; 328—26